US012392629B2

(12) United States Patent
Prukop

(10) Patent No.: US 12,392,629 B2
(45) Date of Patent: Aug. 19, 2025

(54) VIEWPORT SYSTEM FOR DYNAMICALLY FRAMING OF A MAP BASED ON UPDATING DATA

(71) Applicant: Mapbox, Inc., Washington, DC (US)

(72) Inventor: David Prukop, Washington, DC (US)

(73) Assignee: Mapbox, Inc., Washington, DC (US)

( * ) Notice: Subject to any disclaimer, the term of this patent is extended or adjusted under 35 U.S.C. 154(b) by 359 days.

(21) Appl. No.: 17/515,408

(22) Filed: Oct. 30, 2021

(65) Prior Publication Data

US 2023/0134475 A1    May 4, 2023

(51) Int. Cl.
| | |
|---|---|
| G01C 21/36 | (2006.01) |
| G01C 21/34 | (2006.01) |
| G01S 19/42 | (2010.01) |
| H04W 4/021 | (2018.01) |
| H04W 4/024 | (2018.01) |

(52) U.S. Cl.
CPC ..... *G01C 21/3667* (2013.01); *G01C 21/3415* (2013.01); *G01S 19/42* (2013.01); *H04W 4/021* (2013.01); *H04W 4/024* (2018.02)

(58) Field of Classification Search
CPC ............ G01C 21/3667; G01C 21/3415; G01C 21/3638; G01C 21/3804; G01C 21/3676; G01S 19/42; H04W 4/021; H04W 4/024; A62C 3/0271
See application file for complete search history.

(56) References Cited

U.S. PATENT DOCUMENTS

| | | | | |
|---|---|---|---|---|
| 2012/0197524 A1* | 8/2012 | Beyeler | .............. | G01C 21/3476 701/426 |
| 2013/0131978 A1* | 5/2013 | Han | ........................ | G06T 17/05 701/436 |
| 2013/0321398 A1* | 12/2013 | Howard | ................... | G06T 19/20 345/419 |
| 2013/0325321 A1* | 12/2013 | Pylappan | ............... | G01C 21/20 701/410 |
| 2013/0345962 A1* | 12/2013 | van Os | .............. | G01C 21/3667 701/416 |

* cited by examiner

*Primary Examiner* — Aniss Chad
*Assistant Examiner* — Christine Nguyen Huynh
(74) *Attorney, Agent, or Firm* — Fenwick & West LLP

(57) ABSTRACT

A viewport system dynamically frames and displays important maps features. The viewport system automatically adjusts map parameters to display useful map features to a user. The system determines a state associated with a client device, the state being determined based on telemetry information received from the client device. The system further receives a set of edge insets that defines a viewport which is a region of a screen used to display visualization of a map. The determination of the set of edge insets may take into account other UI elements to avoid obstructions within the view. The system then determines a set of coordinates describing points of interest in the map. The system fits the set of coordinates into the set of edge insets and determine a set of map parameters and then displays the map based on the determined map parameters on a viewport.

20 Claims, 12 Drawing Sheets

1200

Receive a location of the client device
1210

Determine a state associated with a client device
1220

Receive a set of edge insets that indicate the edges of a frame for displaying a map
1230

Receive a set of coordinates that represent points of interest in the map, the points of interest to be displayed in the frame
1240

Determine a set of center coordinates based on the set of coordinates
1250

Generate a view by fitting the set of coordinates inside the frame defined by the edge insets
1260

Display the view to the client device
1270

FIG. 12

VIEWPORT SYSTEM FOR DYNAMICALLY FRAMING OF A MAP BASED ON UPDATING DATA

FIELD OF ART

This description relates to displaying data for visualization, and particularly to providing a viewport system that dynamically displays and frames features of interest based on updating data.

BACKGROUND

Electronic maps are becoming increasingly used to represent spatial aspects of a given geographic area. Electronic maps may also be used to display data that are periodically updated over time. For example, a navigation system may display a route that is continuously updated as a vehicle travels along the route, and a wildfire monitoring system may display, and track areas affected by wildfires. Maps that display dynamic data may involve changes in map parameters such as changes in zoom levels, rotation, etc. Existing implementations often preconfigure map parameters based on static constraints, such as setting zoom level to a predetermined number when the vehicle travels within some distance of a maneuver. The static constraints raise issues when there are changes to data or the area for displaying the map, such as an inability to properly adjust to allow meaningful data display.

SUMMARY

A viewport system dynamically frames and displays important maps features. The viewport system may automatically adjust map parameters to display useful map features—such as intersections, locations, wildfire behaviors—to a user. The viewport system may first determine a state associated with a client device, the state indicating a state of motion associated with the client device and being determined based on telemetry information (such as geographical location coordinates over time) received from the client device. The viewport system further receives a set of edge insets that defines a viewport which is a region of a screen used to display visualization of a map. The determination of the set of edge insets may take into account other UI (user interface) elements to avoid obstructions within the view. The viewport system then determines a set of coordinates describing points of interest in the map for display. Based on the set of edge insets and the set of map coordinates, the viewport system may fit the set of coordinates into the set of edge insets and determine a set of map parameters such as zoom level, map rotation, and pitch level, etc. The viewport system may then display the map based on the determined map parameters on a viewport.

The disclosed viewport system provides various advantageous technical features that help improve the user experience relative to conventional systems. For example, the viewport system dynamically adjusts map parameters such as zoom levels based on the map features of interest to display. Instead of setting predetermined zoom levels as implemented in traditional map display systems, the viewport system dynamically changes zoom levels based on the amount of information to display (e.g., the amount of route left to navigate). Further, the viewport system dynamically adjusts map parameters based on other UI elements and avoids conflicts with other UI elements. For example, in a traditional display system, the zoom level may be fixed for a map. A user may open a radio application, and the UI element for the radio may be overlaid on the map, possibly obscuring important map features. The viewport system resolves the issue by adjusting the edge insets for displaying the map, and as a result, the zoom level is adjusted to fit the map coordinates for display in the edge insets such that important map features to display are not blocked by other UI elements.

The viewport system may also be applied to a range of use cases to improve user experiences. For example, the viewport system may help to stabilize the camera viewpoint when navigating on a winding road by reducing the degree of viewpoint oscillation. The viewport system provides a more stable navigation view by pointing the map towards a point on the route rather than constantly rotating with the heading of the vehicle. As another example use case, the viewport system can improve user experience in an arrival mode when a vehicle is approaches destination. Instead of immediately exiting the navigation mode or reinitiating the navigation process, the viewport system may enter an arrival mode that displays the destination in the viewport such that the user may navigate around the destination while looking for potential parking spaces without losing sight of the destination.

BRIEF DESCRIPTION OF THE DRAWINGS

The teachings of the embodiments can be readily understood by considering the following detailed description in conjunction with the accompanying drawings.

FIG. 12 is a flowchart that illustrates an example process for dynamically framing a map, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
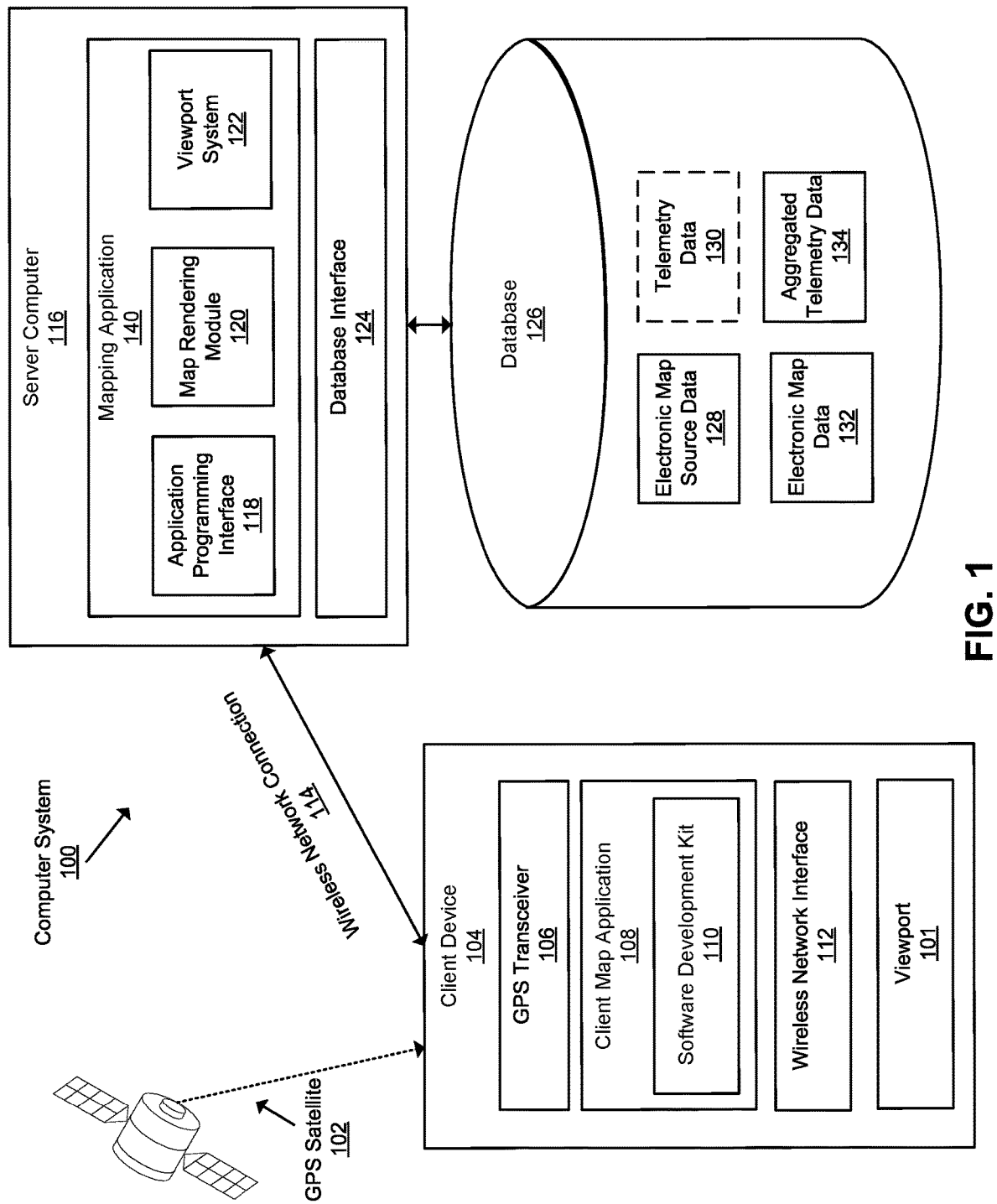
FIG. 1 illustrates an example computer system in which the techniques described may be practiced, according to one embodiment.

FIG. 1 illustrates an example computer system 100 in which the techniques described may be practiced, in accordance with an embodiment. In the embodiment illustrated in FIG. 1, the computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a server computer 116 that provides users with data to display on a client device 104 that is connected to the server computer 116 via a wireless network connection 114. The server computer 116 is further coupled to a database 126 that stores various types of data for analysis and for displaying on the client device 104. A GPS satellite 102 is coupled via a wireless connection to the client device 104. The server computer 116 comprises a mapping application 140, application programming interface (API) 118, and database interface 124. The database 126 comprises electronic map source data 128, telemetry data 130, electronic map data 132, and aggregated telemetry data 134. The client device 104 comprises a GPS transceiver 106, client map application 108, software development kit (SDK) 110, and wireless network interface 112.

Server Computer

Server computer 116 may be any computing device, including but not limited to: servers, racks, workstations, personal computers, general purpose computers, laptops, Internet appliances, wireless devices, wired devices, multi-processor systems, mini-computers, and the like. Although FIG. 1 shows a single element, the server computer 116 broadly represents one or multiple server computers, such as a server cluster, and the server computer may be located in one or more physical locations. Server computer 116 also may represent one or more virtual computing instances that execute using one or more computers in a datacenter such as a virtual server farm.

Server computer 116 is communicatively connected to database 126 and client device 104 through any kind of computer network using any combination of wired and wireless communication, including, but not limited to: a Local Area Network (LAN), a Wide Area Network (WAN), one or more internetworks such as the public Internet, or a company network. Server computer 116 may host or execute mapping application 140, and may include other applications, software, and other executable instructions, such as database interface 124, to facilitate various aspects of embodiments described herein.

In one embodiment, mapping application 140 comprises program instructions that are programmed or configured to perform a variety of backend functions needed for electronic mapping including, but not limited to: sending electronic map data 132 to mobile computing devices, receiving telemetry data 130 from mobile computing devices, processing telemetry data 130 to generate aggregated telemetry data 134, receiving electronic map source data 128 from data providers, and processing electronic map source data 128 to generate electronic map data 132. In one embodiment, the mapping application 140 also performs backend functions related to a viewport system 122 such as determining map coordinates for display, determining edge insets for a viewport, fitting map coordinates in the edge insets, and adjusting zoom levels dynamically based on an amount of information to frame and display in an area defined by the edge insets. In the embodiment illustrated in FIG. 1, the mapping application 140 includes an API 118, a map rendering module 120, and a viewport system 122. In other embodiments, the mapping application 140 may include additional, fewer, or different components for various applications.

The API 118 may implement functional calls, callbacks, methods or other programmatic means that perform a variety of functions that control map display and animations for rendering a map in a viewport. For example, API 118 may include functions including but not limited to the following: controlling transitioning to various views of the map, controlling framing of map based on different modes of a camera, adjusting map parameters such as center map coordinates, map rotation, pitch level, map rotation, and updating location information based on GPS data, etc.

The map rendering module 120 renders map tiles representing corresponding geographic regions that can be used to render digital maps at various scales or resolutions, such as by stitching together the set of rendered map tiles. The map tiles are rendered from corresponding vector data that can be used to dynamically render the map tile. The vector data of the map tiles include geometric information representing geographic features of a geographic region (e.g., roads, terrain, buildings, etc.) and metadata including associated labels describing characteristics of the geographic region, such as the geographic features. The labels may include text (e.g., geographic features names), symbols or icons (e.g., symbols for different types of geographic features), or any other suitable visual indicator of a map tile characteristic. After rendering a map tile, the map rendering module 120 may provide the rendered map tiles for rendering a digital map, e.g., on the client device 104. In one embodiment, the map rendering module 120 may render map tiles based on information provided by the viewport system for displaying a frame of a map. The map rendering module 120 may receive requests from the viewport system 122 relating to dimension and map coordinates to display, and may render the map tiles for the viewport system to display.

The viewport system 122 provides APIs that dynamically animate maps and frame important map features for display in a viewport defined by a set of edge insets. In one embodiment, the viewport system 122 animates visualization of data display on a map. The viewport system 122 may be used to display any type of map with dynamically-updated data, such as the map of a navigation system, or maps tracking wildfires, etc. The viewport system 122 takes, as input, a set of map coordinates that include important map features to display and a set of edge insets that define a display area as input. The viewport system 122 may calculate a set of map parameters such as zoom level, pitch level, anchor point, map rotation, etc. by fitting the set of map coordinates into the set of edge insets. In the embodiment illustrated in FIG. 1, the viewport system 122 is included in server computer 116. In alternative embodiments, functionalities performed by the viewport system 122 may be performed partially or completely on the client device 104.

In one embodiment, the viewport system 122 may combine the map display with other UI (user interface) elements in a viewport. The viewport system may dynamically calculate a set of edge insets and dynamically adjust zoom levels of the map so that the presentation of the map doesn't obscure UI elements.

The viewport system 122 may be applied to a wide range of various use cases in a navigation system. For example, the viewport system 122 may help provide a better user experience for situations such as navigating on a winding road or approaching a destination (arrival mode). For example, a traditional navigation display for driving on a winding road may be disorienting to a driver as the camera view may swing back and forth as a vehicle makes each turn. The viewport system 122 improves the user experience by reducing frequent and extreme camera rotations and allowing the map to rotate towards the direction of an end of a road portion. As another example use case, the viewport system 122 helps to improve the user experience when approaching a destination by framing the destination in the viewport instead of finishing the navigation or reinitiating a navigation process to the destination. The example use cases for winding road and arrival mode are discussed in further detail below with respect to FIG. 4. The viewport system 122 is discussed in further details in accordance with FIG. 3.

In one embodiment, database interface 124 is a programmatic interface such as JDBC or ODBC for communicating with database 126. The database interface 124 may communicate with any number of databases and any type of database, in any format. The database interface 124 may be custom software created by an entity associated with mapping application 140 or may be created by a third-party entity in part or in whole.

Database

In one embodiment, the database 126 is a data storage subsystem consisting of programs and data that is stored on any suitable storage device such as one or more hard disk drives, memories, or any other electronic digital data recording device configured to store data. Although database 126 is depicted as a single device in FIG. 1, database 126 may span multiple devices located in one or more physical locations. For example, database 126 may include one or more nodes located at one or more data warehouses. Additionally, in one embodiment, database 126 may be located on the same device or devices as server computer 116. Alternatively, database 126 may be located on a separate device or devices from server computer 116.

Database 126 may be in any format, such as a relational database, a noSQL database, or any other format. Database 126 is communicatively connected with server computer 116 through any kind of computer network using any combination of wired and wireless communication of the type previously described. Optionally, database 126 may be communicatively connected with other components, either directly or indirectly, such as one or more third party data suppliers. Generally, database 126 stores data related to electronic maps including, but not limited to: electronic map source data 128, telemetry data 130, electronic map data 132, and aggregated telemetry data 134. These datasets may be stored as columnar data in a relational database or as flat files.

In one embodiment, electronic map source data 128 is raw digital map data that is obtained, downloaded or received from a variety of sources. The raw digital map data may include satellite images, digital street data, building or place data or terrain data. Example sources include the National Aeronautics and Space Administration (NASA), the United States Geological Survey (USGS), and DigitalGlobe. The electronic map source data 128 may be updated at any suitable interval and may be stored for any amount of time. Once obtained or received, electronic map source data 128 is used to generate electronic map data 132.

In one embodiment, electronic map data 132 is digital map data that is provided, either directly or indirectly, to client map applications, such as client map application 108, using an API, such as API 118. The electronic map data 132 is based on electronic map source data 128. Specifically, the electronic map source data 128 is processed and organized as a plurality of vector tiles which may be subject to style data to impose different display styles. Electronic map data 132 may be updated at any suitable interval and may include additional information beyond that derived from electronic map source data 128. For example, using aggregated telemetry data 134, discussed below, a variety of additional information may be stored in the vector tiles, such as traffic patterns, turn restrictions, detours, common or popular routes, speed limits, new streets, and any other information related to electronic maps or the use of electronic maps.

In one embodiment, telemetry data 130 is digital data that is obtained or received from mobile computing devices via function calls that are included in a Software Development Kit (SDK) 110 that application developers use to integrate and include electronic maps in applications. As indicated by the dotted lines, telemetry data 130 may be transiently stored, and are processed as discussed below before storage as aggregated telemetry data 134.

The telemetry data 130 may include mobile device location information based on GPS signals. For example, telemetry data 130 may comprise one or more digitally stored events, in which each event comprises a plurality of event attribute values. Telemetry events may include session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp. In one embodiment, telemetry data 130 may include information associated with the client device 104. If the client device 104 is a vehicle, telemetry data 130 may include information associated with the vehicle, such as speed, gear selection, status of engine, or any other information associated with vehicle configuration or status.

In one embodiment, aggregated telemetry data 134 is telemetry data 130 that has been processed using anonymization, chunking, filtering, or a combination thereof. Anonymization may include removing any data that identifies a specific mobile device or person. Chunking may include segmenting a continuous set of related telemetry data 130 into different segments or chunks representing portions of travel along a route. For example, telemetry data 130 may be collected during a drive from John's house to John's office. Chunking may break that continuous set of telemetry data 130 into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data 130 into any size. Filtering may remove inconsistent or irregular data, delete traces or trips that lack sufficient data points, or exclude any type or portion of data for any reason. Once processed, aggregated telemetry data 134 is stored in association with one or more tiles related to electronic map data 132. Aggregated telemetry data 134 may be stored for any amount of time, such as a day, a week, or more. Aggregated telemetry data 134 may be further processed or used by various applications or functions as needed.

Mobile Computing Device

In one embodiment, client device 104 is any mobile computing device, such as a laptop computer, hand-held computer, wearable computer, cellular or mobile phone, portable digital assistant (PDAs), tablet computer, or a vehicle with a navigation system. Although a single mobile computing device is depicted in FIG. 1, any number of mobile computing devices may be present. Each client device 104 is communicatively connected to server computer 116 through wireless network connection 114 which comprises any combination of a LAN, a WAN, one or more internetworks such as the public Internet, a cellular network, or a company network.

Client device 104 is communicatively coupled to GPS satellite 102 using GPS transceiver 106. GPS transceiver 106 is a transceiver used by client device 104 to receive signals from GPS satellite 102, which broadly represents three or more satellites from which the mobile computing device may receive signals for resolution into a latitude-longitude position via triangulation calculations.

Client device 104 also includes wireless network interface 112 which is used by the mobile computing device to communicate wirelessly with other devices. In particular, wireless network interface 112 is used to establish wireless network connection 114 to server computer 116. Wireless network interface 112 may use Wi-Fi, WiMAX, Bluetooth, ZigBee, cellular standards, or others.

Client device 104 also includes other hardware elements, such as one or more input devices, memory, processors, and the like, which are not depicted in FIG. 1. Client device 104 also includes applications, software, and other executable instructions to facilitate various aspects of embodiments described herein. These applications, software, and other executable instructions may be installed by a user, owner, manufacturer, or other entity related to mobile computing device.

In one embodiment, client device 104 includes client map application 108 which is software that displays, uses, supports, or otherwise provides electronic mapping functionality as part of the application or software. Client map application 108 may be any type of application, such as a taxi service, a video game, a chat client, a food delivery application, etc. In one embodiment, the client map application 108 may be configured for a variety of functions involving map data, such as navigation, transportation, augmented reality, product delivery, etc. In an embodiment, the client map application 108 obtains electronic mapping functions through an SDK 110, which may implement function calls, callbacks, methods or other programmatic means for contacting the server computer to obtain digital map tiles, layer data, or other data that can form the basis of visually rendering a map as part of the application. In general, SDK 110 is a software development kit that allows developers to implement electronic mapping without having to design all of the components from scratch. For example, SDK 110 may be downloaded from the Internet by developers, and subsequently incorporated into an application which is later used by individual users.

In one embodiment, client map application 108 may download the SDK 110 from the viewport system 122 for dynamically framing and displaying a map based on points of interest to focus on. Client map application 108 may execute methods or function calls provided by the viewport system 122 and dynamically render maps within a viewport 101 (described in more detail below) such that a view of the map dynamically changes based on a set of edge insets that define dimensions of the view and a set of map coordinates. Client map application 108 may perform one or more functionalities described in the viewport system 122.

In the server computer 116, the mapping application 140 provides the API 118 that may be accessed, for example, by client map application 108 using the SDK 110 to provide electronic mapping to client map application 108. Specifically, mapping application 140 comprises program instructions that are programmed or configured to perform a variety of backend functions needed for electronic mapping including, but not limited to: sending electronic map data 132 to mobile computing devices, receiving telemetry data 130 from mobile computing devices, processing telemetry data 130 to generate aggregated telemetry data 134, receiving electronic map source data 128 from data providers, processing electronic map source data 128 to generate electronic map data 132, and any other aspects of embodiments described herein. For example, the client device 104 may communicate with the mapping application 140 in order to receive map data. The client device 104 may use the map data for a variety of purposes, such as displaying a digital map or providing navigation services. In embodiments the client device 104 (e.g., its client map application 108) requests a set of rendered map tiles from the mapping application 140 for rendering a digital map on a display of the client device. For instance, the client device 104 may request a set of rendered map tiles for rendering a digital map representing a particular geographic region at one or more scales or resolutions. In this case, the client device 104 may receive the set of rendered map tile from the mapping application 140 and stitch together the set of rendered map tiles to render the digital map.

Client device 104 may include a viewport 101 for displaying maps or other UI elements. A viewport is a region of a screen used to display visualization of a map or a portion of the map. A viewport may be defined by a set of boundaries associated with the screen and a set of edge insets that define the dimensions of the viewport, where the edge insets are used during view layout to modify the dimensions of a viewport's frame. For example, positive edge insets values cause the frame to be inset (or shrunk) by a specified amount and negative values cause the frame to be outset (or expanded) by a specified amount. In the embodiment illustrated in FIG. 1, viewport 101 is displayed through a displaying device in the client device 104, while in other embodiments, viewport 101 may be displayed through a displaying device that is separate from the client device 104 (e.g. a monitor for displaying wildfire tracking in a monitoring station while the client device 104 is a camera that collects information onsite.) The viewport 101 may display maps as well as other UI elements, such as UI for other applications (e.g. music player, radio control panel, etc.).

According to one embodiment, the techniques described herein are implemented by one or more special-purpose computing devices. For example, the server computer 116 and client device 104 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

System Architecture

Figure 2:
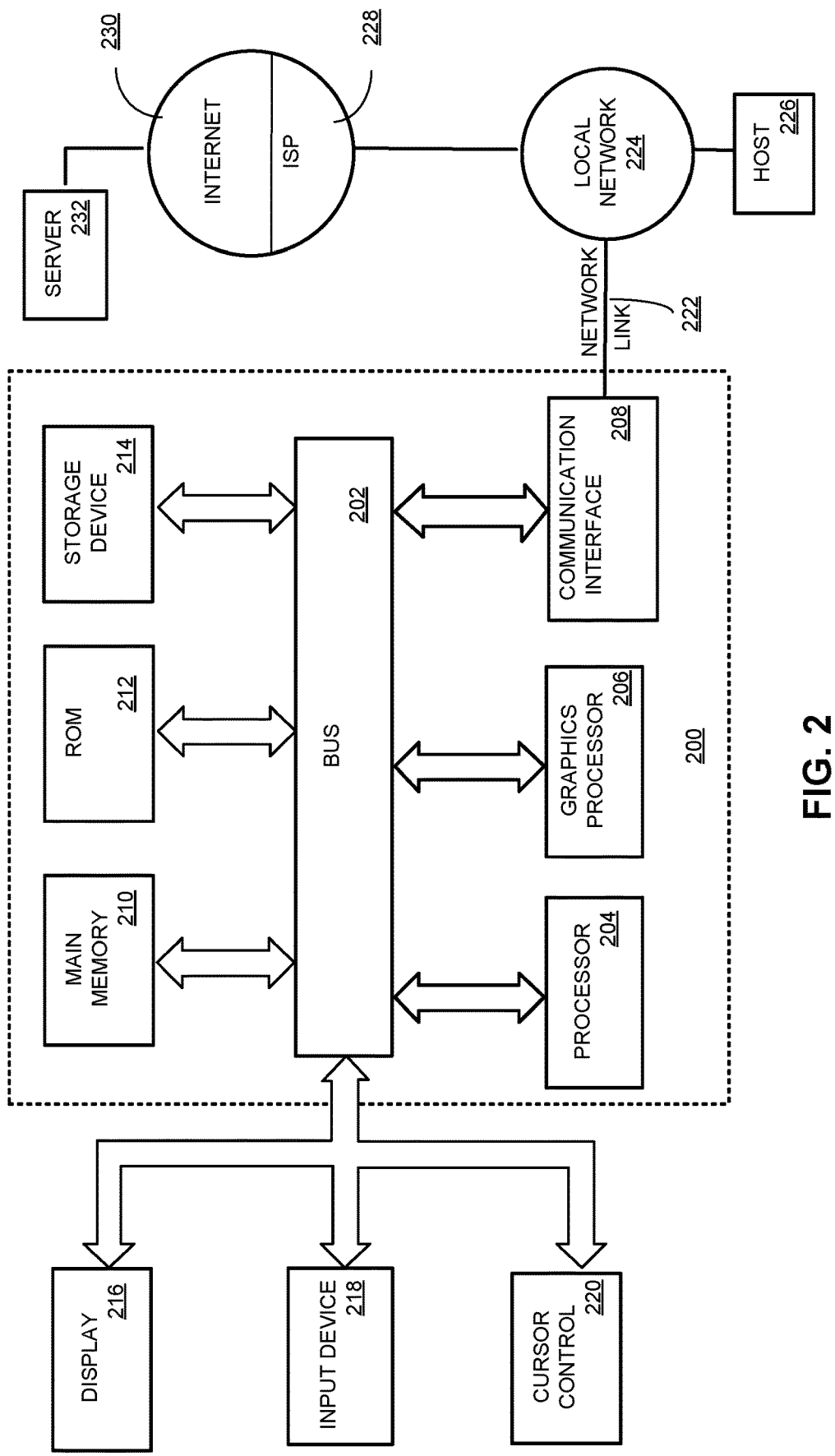
FIG. 2 is a block diagram that illustrates a computer system upon which an embodiment of the invention may be implemented, according to one embodiment.

FIG. 2 is a block diagram that illustrates a computer system 200 upon which an embodiment of the invention may be implemented. For example, a computer system 200 could be used to implement some or all of the client device 104 or server computer 116 of FIG. 1. Computer system 200 includes a bus 202 or other communication mechanism for communicating information, and a hardware processor (CPU) 204 and graphics processor (GPU) 206 coupled with bus 202 for processing information. CPU 204 may be, for example, a general-purpose microprocessor. GPU 206 may be, for example, a graphics processing unit with a high core count which is optimized for parallel processing and graphics rendering.

Computer system 200 also includes a main memory 210, such as a random-access memory (RAM) or other dynamic storage device, coupled to bus 202 for storing information and instructions to be executed by CPU 204. Main memory 210 also may be used for storing temporary variables or other intermediate information during execution of instructions to be executed by CPU 204 and/or GPU 206. Such instructions, when stored in non-transitory storage media accessible to CPU 204 and/or GPU 206, render computer system 200 into a special-purpose machine that is customized to perform the operations specified in the instructions.

Computer system 200 further includes a read only memory (ROM) 212 or other static storage device coupled to bus 202 for storing static information and instructions for CPU 204 and/or GPU 204. A storage device 214, such as a magnetic disk or optical disk, is provided and coupled to bus 202 for storing information and instructions.

Computer system 200 may be coupled via bus 202 to a display 216, such as an LCD screen, LED screen, or touch screen, for displaying information to a computer user. An input device 218, which may include alphanumeric and other keys, buttons, a mouse, a touchscreen, and/or other input elements is coupled to bus 202 for communicating information and command selections to CPU 204 and/or GPU 206. In some embodiments, the computer system 200 may also include a cursor control 220, such as a mouse, a trackball, or cursor direction keys for communicating direction information and command selections to CPU 204 and/or GPU 206 and for controlling cursor movement on display 216. The cursor control 220 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to CPU 204 and/or GPU 206 executing one or more sequences of one or more instructions contained in main memory 210. Such instructions may be read into main memory 210 from another storage medium, such as storage device 214. Execution of the sequences of instructions contained in main memory 210 causes CPU 204 and/or GPU 206 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 214. Volatile media includes dynamic memory, such as main memory 210. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to CPU 204 and/or GPU 206 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 210, from which CPU 204 and/or GPU 206 retrieves and executes the instructions. The instructions received by main memory 210 may optionally be stored on storage device 214 either before or after execution by CPU 204 and/or GPU 206.

Computer system 200 also includes a communication interface 208 coupled to bus 202. Communication interface 208 provides a two-way data communication coupling to a network link 222 that is connected to a local network 224. For example, communication interface 208 may be an integrated services digital network (ISDN) card, cable modem, satellite modem, or a modem to provide a data communication connection to a corresponding type of telephone line. As another example, communication interface 208 may be a local area network (LAN) card to provide a data communication connection to a compatible LAN. Wireless links may also be implemented. In any such implementation, communication interface 208 sends and receives electrical, electromagnetic or optical signals that carry digital data streams representing various types of information.

Network link 222 typically provides data communication through one or more networks to other data devices. For example, network link 222 may provide a connection through local network 224 to a host computer 226 or to data equipment operated by an Internet Service Provider (ISP) 228. ISP 228 in turn provides data communication services through the worldwide packet data communication network now commonly referred to as the "Internet" 230. Local network 224 and Internet 230 both use electrical, electromagnetic or optical signals that carry digital data streams. The signals through the various networks and the signals on network link 222 and through communication interface 208, which carry the digital data to and from computer system 200, are example forms of transmission media.

Computer system 200 can send messages and receive data, including program code, through the network(s), network link 222 and communication interface 208. In the Internet example, a server 232 might transmit a requested code for an application program through Internet 230, ISP 228, local network 224 and communication interface 208. The received code may be executed by CPU 204 and/or GPU 206 as it is received, and stored in storage device 214, or other non-volatile storage for later execution.

Viewport System

Figure 3:
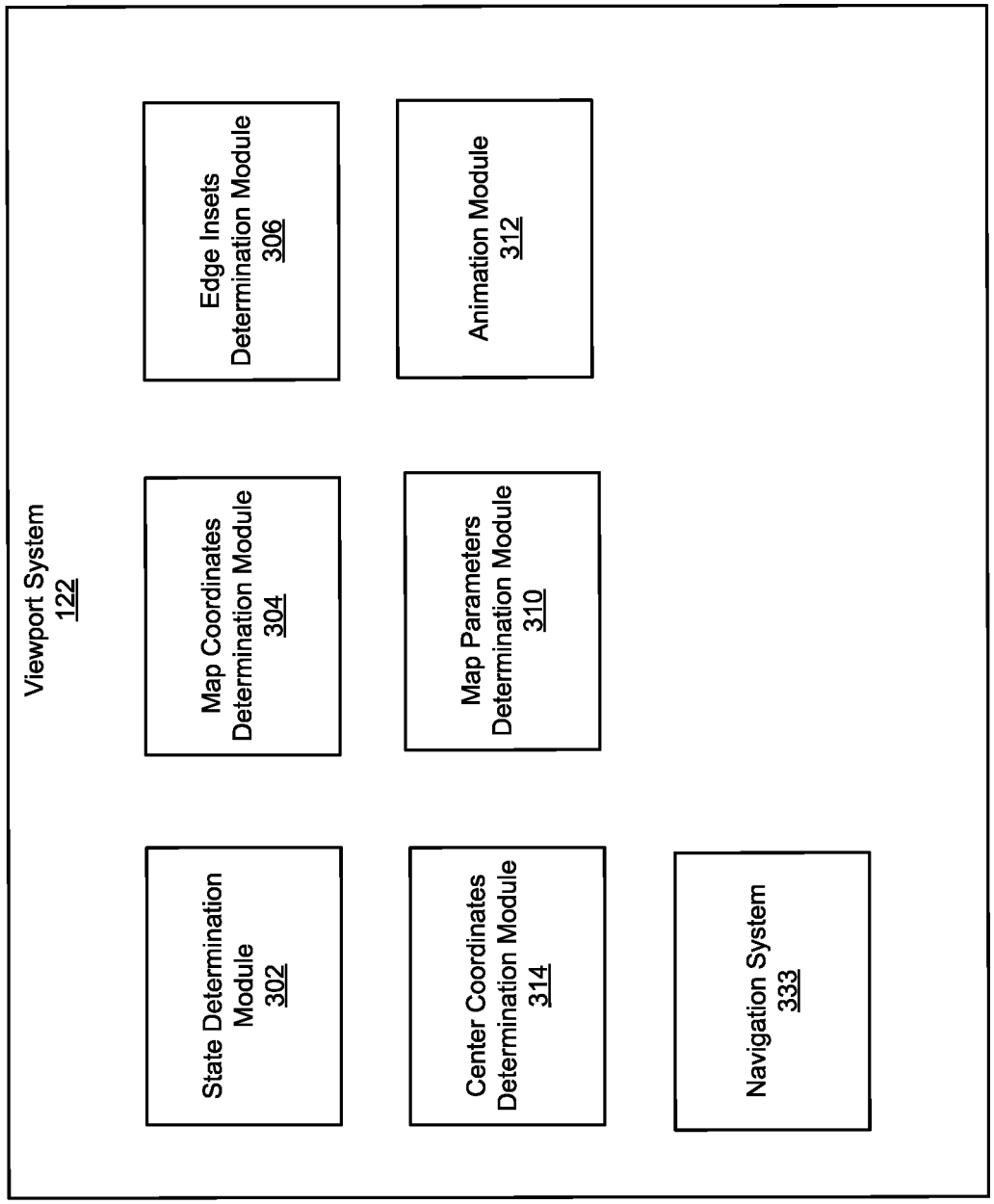
FIG. 3 illustrates an example embodiment of a viewport system, according to one embodiment.

FIG. 3 illustrates an example embodiment of a viewport system 122 that dynamically animates and frames important map features inside a viewport defined by a set of edge insets for display. The viewport system 122 includes a state determination module 302 that determines a state of a client device 104, a map coordinates determination module 304 that determines a set of map coordinates describing important features to display, an edge insets determination module 306 that determines a set of edge insets defining dimensions of a viewport, a max/min zoom level determination module 308 that determines a maximum and a minimum zoom level of a view of map based on density of important features on a map, a center coordinates determination module 314 that determines a set of center coordinates for the view of the map, a map parameters determination module 310 that calculates map parameters such as a zoom level of the map for the viewport 101, an animation module 312 that controls animations caused by state transitioning and data updates, and a navigation system 333 that controls navigation display using modules provided by viewport system 122. In one embodiment, one or more modules included in the viewport system 122 may be included in the client device 104.

The state determination module 302 may determine a state associated with the client device 104. In one embodiment, the determined state may be used to determine information to display (such as map coordinates) for display in viewport 101. The state may be determined based on telemetry data 130 or aggregated telemetry data 134 collected from client device 104. For example, state changes may be initiated by user interaction which may be collected by telemetry data 130. Alternatively, state changes may be automatically triggered by preconfigured rules. In one embodiment, the state may be customized and defined by a user and the state determination module 302 may determine a state associated with the client device 104 based on a set of pre-configured rules. In the example of wildfire tracking, different states may be determined based on different characteristics associated with wildfire, such as speed of spreading, etc. In an example of a navigation system, the various states of a client device 104 may refer to various driving states associated with a vehicle. For example, a vehicle may be in a pre-driving state when the vehicle is just started, or the vehicle may be in a following state where the vehicle is following a route programmed by the navigation system. Example user interfaces for the various driving states are further discussed in accordance with the driving state determination module 402 in FIG. 4 and are illustrated in FIGS. 5-12.

Map coordinates determination module 304 may determine a set of map coordinates for display in the viewport 101. In one embodiment, the set of map coordinates are determined based on points of interest to display in a map, where the points of interest are features that have certain properties, such as intersections in a map, corners, and turning points in a map. Other examples of points of interest may include points, edges, objects, boundaries, traffic lights, etc. in a map. The points of interest may be updated as data to display in the map change over time. For example, in a wildfire tracking map, as the area affected by wildfires shrinks or expands, the amount of information to display in the map changes and the set of map coordinates may change correspondingly. With each update in data, map coordinates determination module 304 may add additional map coordinates or remove map coordinates that are no longer of interest. The points of interest may be customized and identified based on a set of rules, and map coordinates corresponding to the points of interest may be retrieved. In one embodiment, the points of interest to display may be determined based on states determined by state determination module 302. For example, in a navigation system, while a vehicle is in a route preview mode, the map coordinates determination module 304 may determine that points along the whole route are of interest to a viewer and the set of determined map coordinates may include the whole route, while in other driving states, the map coordinates determination module 304 may only decide to include a subset of map coordinates to show part of the route.

Edge insets determination module 306 determines a set of edge insets that define an area in the viewport 101 for displaying the map. In one embodiment, edge insets are used during view layout to modify the dimensions of a viewport's frame. For example, positive edge insets values cause the frame to be inset (or shrunk) by a specified amount and negative values cause the frame to be outset (or expanded) by a specified amount. In one embodiment, edge insets determination module 306 may determine edge insets to avoid overlay with other UI elements on the screen. For example, a display screen on a vehicle may display a map for navigation but also display UI elements for other applications such as a music player, or a radio control panel. The edge insets determination module 306 may determine dimensions for an area to display the map such that the area to display the map is not obscured by other UI elements in the viewport 101.

Center coordinates determination module 314 determines a set of center map coordinates for the center of the area of the map to frame. Center coordinates are determined based on the set of map coordinates (e.g. points of interest) to display. In one embodiment, center coordinates determination module 314 may determine the center coordinates based on a centroid of the set of map coordinates, where a centroid may be an average position derived based on the set of map coordinates, with the average position minimizing the distance to each map coordinate of the set of map coordinates to display. Because the set of map coordinates may change over time based on updated data, center coordinates determination module 314 may recalculate a centroid and determine a set of center coordinates for each update in the set of map coordinates.

Map parameter determination module 310 may determine various parameters associated with a map, where the parameters define how the map is presented. Examples of map parameters include zoom level, direction of heading of the map, pitch level, and animation map parameters such as rotation, map updates, and transition animations. In one embodiment, map parameters determination module 310 may determine a set of map parameters based on the set of map coordinates determined by map coordinates determination module 304 and the set of edge insets determined by edge insets determination module 306. For example, a zoom level may be determined by fitting the set of map coordinates into the set of edge insets. In one embodiment, map parameters such as pitch level and rotation may be predetermined based on a state determined by the state determination module 302. For example, in a navigation system, a route overview state may not have a pitch angle associated with the map, while in a following state that follows a programmed route the navigation system 333 may present the map with a pitch angle such that the map is tilted in an angle that makes the "puck" (graphical indicator representing the vehicle) appear closer to the viewer of the map. Further details regarding map parameter determination for the navigation system 333 are discussed with respect to FIG. 4.

Animation module 312 may control animations associated with updates in a map. An animation may occur when the data to display is updated (also referred to as update animation) or the state of view is changed (also referred to as transition animation). An update in data may occur each time the GPS transceiver 106 receives updated position data, and as a result, the respective view of the map needs to be updated based on the updated position data. For example, in a wildfire monitoring map, as the wildfires are put out or spread to a larger area, corresponding map coordinates to display may change and animation may be used to illustrate the change in data. The transition animation may refer to animation due to transition in states determined by the state determination module 302. For example, responsive to a user initiating a navigation process for a programmed route, the navigation system may transition from a route preview state to a route following state where a vehicle starts to follow a programmed route, which leads to an animation transitioning from a first state to a second state.

In one embodiment, the animation module 312 may use an interpolator to animate the map from a first view to a second view. An interpolator defines the rate of change of an animation by calculating interpolating values given a set of initial values and a set of final values. For example, suppose animation module 312 is to animate from a first view of the map that is associated with a first set of map parameters and map coordinates to a second view of the map associated with a second set of map parameters and map coordinates, the animation module 312 may use the first and the second sets of map parameters and map coordinates as input to an interpolator, which may smoothly animate the changes and accomplish the transition from the first view to the second view. In one embodiment, a user may adjust the speed of animation for each property (e.g. zoom level, pitch angle, anchor point, etc.) of the map using the interpolator. A user may define separate animations for each property, with each property having its own interpolator with delay, duration and easing curves.

Navigation system 333 controls functionalities related to navigation display using modules provided by viewport system 122. Navigation system 333 is discussed in further detail in accordance with FIG. 4 below.

Navigation System

Figure 4:
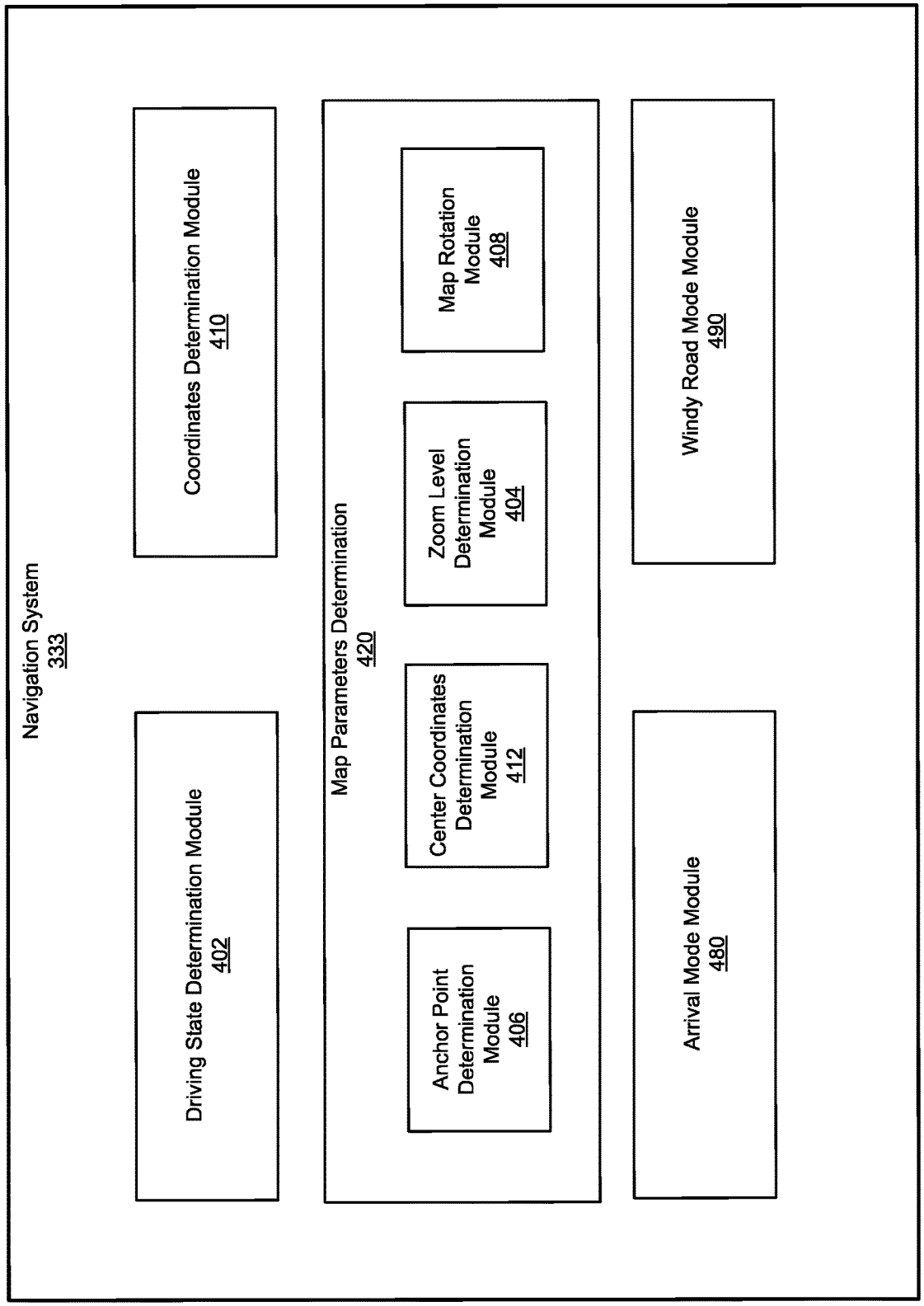
FIG. 4 illustrates an example embodiment of a navigation system, according to one embodiment.

FIG. 4 illustrates an example embodiment of a navigation system that dynamically frames and displays a map using functionalities provided by the viewport system 333. The navigation system 333 includes a driving state determination module 402 that determines a driving state for a client device 104, a coordinates determination module 410 that dynamically determines map coordinates to display, a map parameter determination module 420 that determines a set of map parameters for displaying the map given a set of edge insets and map coordinates to display, an arrival mode module 480 that provides various features when a vehicle is near the destination, and a winding road mode module 490 that provides various features for a vehicle that navigates on a road with continuous maneuvers. In one embodiment, the navigation system 333 may use functionalities provided by modules included in the viewport system 122 and may include additional or less modules as illustrated in FIG. 4. In the example embodiment of the navigation system 333, the client device 104 may be a navigation system on a vehicle or any device that is portable or free to move.

Driving state determination module 402 determines a driving state of a vehicle based on telemetry data received from client device 104. A driving state may be determined based on configuration or status (e.g. speed or gear) of a client device 104 or may be determined based on user inputs received from client device 104 (e.g. a search for a destination). Examples of driving states include but are not limited to the following: pre-drive, free drive, search results, route preview, following, approaching maneuver, search along route, route preview to stopover, etc. The various driving states may be determined based on information received from the client device 104, such as configuration of a vehicle, speed, gear selector, user input (e.g. searching for a destination or search for a keyword) from client device 104, etc. For example, a pre-drive state is when a vehicle is started but has not yet begun to move, a free drive state is when the vehicle starts moving but a destination has not been specified, and a following mode is when the vehicle is following along a programmed route. Example embodiments of various driving states are further illustrated in accordance with FIGS. 5-10.

Coordinates determination module 410 determines a set of map coordinates to display based on a current location of the vehicle and remaining route as the vehicle navigates along the programmed route. In one embodiment, the set of map coordinates to display may be determined based on the driving state determined by the driving state determination 402. For example, in a route overview state, a complete route may be displayed to present an overview of the route, and the coordinates determination module 410 may determine to include map coordinates corresponding to the entire route from the current location to the destination in the set of map coordinates. As another example, in a state when approaching a maneuver, coordinates determination module 410 may determine to include points of interest in a range of radius around the maneuver (e.g. a radius of 300 meters) to give a closeup view of the maneuver.

In one embodiment, coordinates determination module 410 may determine a set of map coordinates to display based on density of points of interest along a programmed route. Coordinates determination module 410 may determine a reference distance based on an average distance between remaining points of interest along the remaining route. The reference distance may be the average distance multiplying by a constant or a parameter. For example, in a dense city, the reference distance may be 500 meters while in a rural area, the reference distance may be 50 miles. The reference distance is then used to determine the amount of information to include in a frame. For example, if the reference distance is 500 meters, coordinates determination module 410 may determine to include the points of interest within 500 meters from the current vehicle location. Using reference distance in determining the amount of information to frame in a view may provide a better user experience such that in an area with dense points of interest (such as a city), the frame may zoom in and show more details, and in an area with less frequent points of interest (such as on a freeway), the frame may zoom out and display the surroundings on a higher level. A navigation step to a point of interest such as a maneuver or intersection may be referred to as a step. A navigation process may consist of multiple steps with each step navigating to a point of interest. A current step may refer to a step that a vehicle is current travelling to the next point of interest (e.g. driving along a freeway until an exit).

Map parameter determination module 420 determines various map parameters such as zoom level, map rotation, anchor point, and pitch level for displaying a map. In one embodiment, map parameter determination module 420 includes an anchor point determination module 406 that controls pitch level for presenting a map, a zoom level determination module 404 that determines a zoom level for displaying a map, a map rotation module 408 that controls rotation of the map, and a center coordinates determination module 412 that determines a set of center map coordinates for framing a map.

Figure 5:
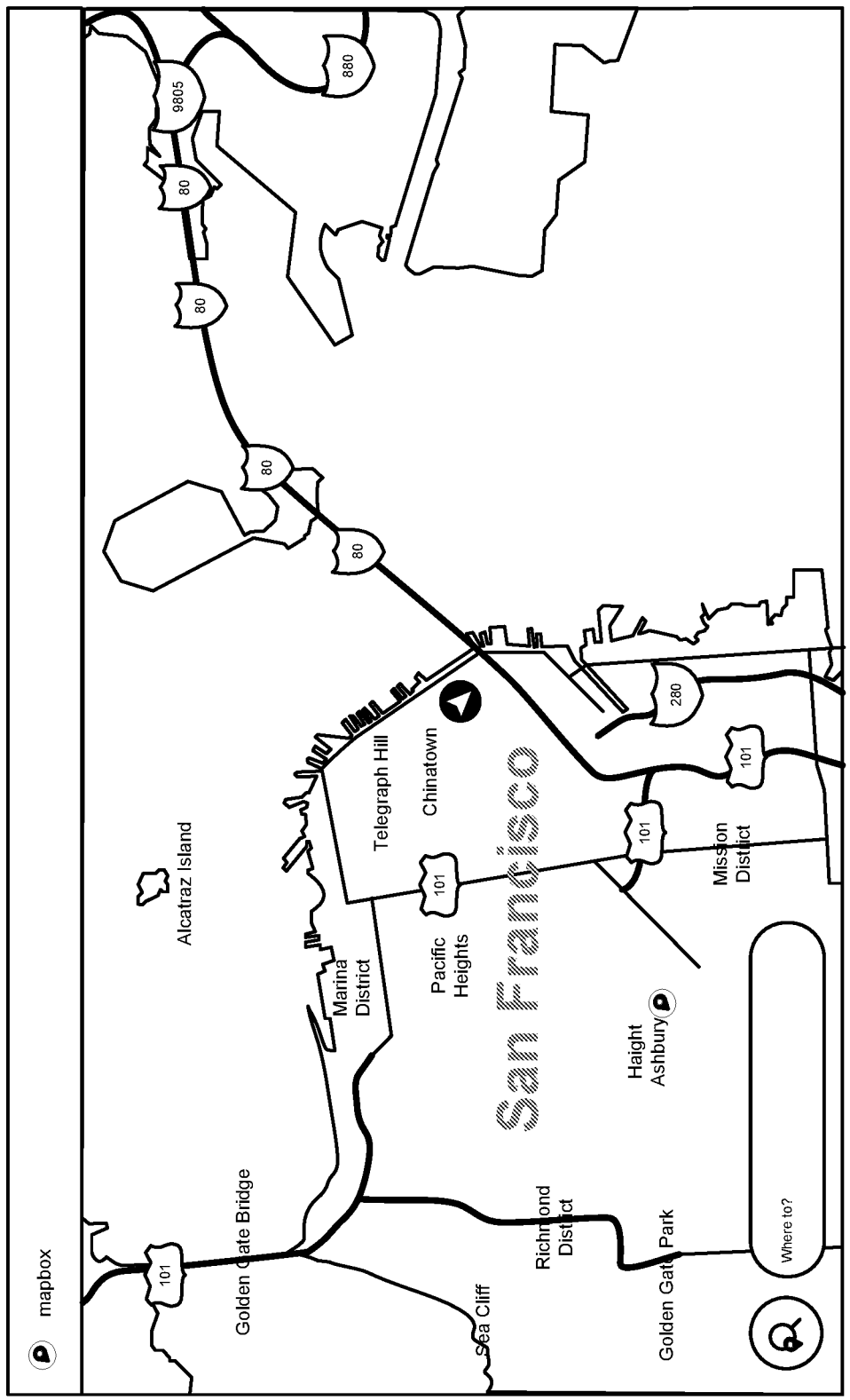
FIG. 5 illustrates an exemplary user interface for a pre-drive state, according to one embodiment.
Figure 6:
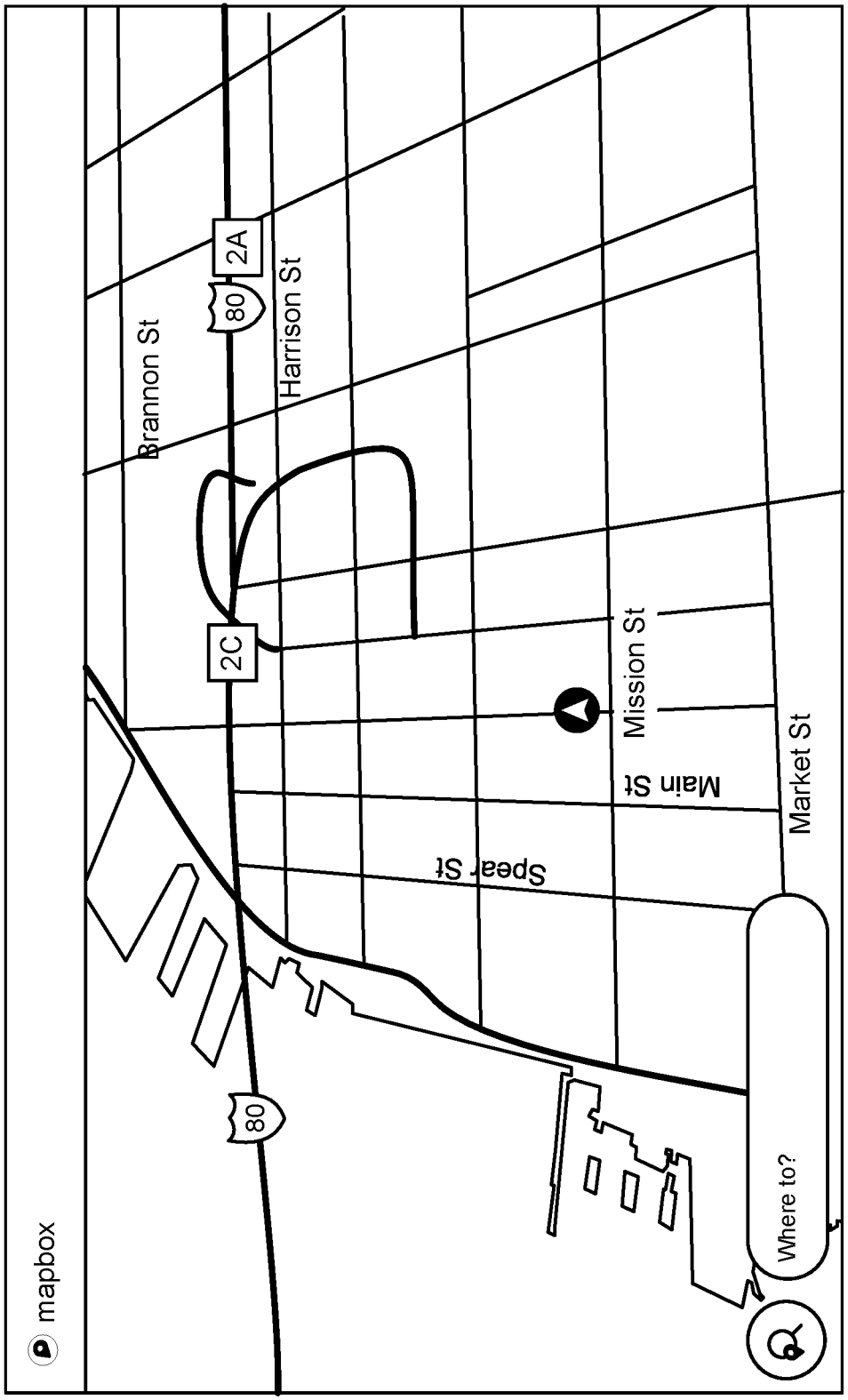
FIG. 6 illustrates an exemplary user interface for a free-drive state, according to one embodiment.
Figure 7:
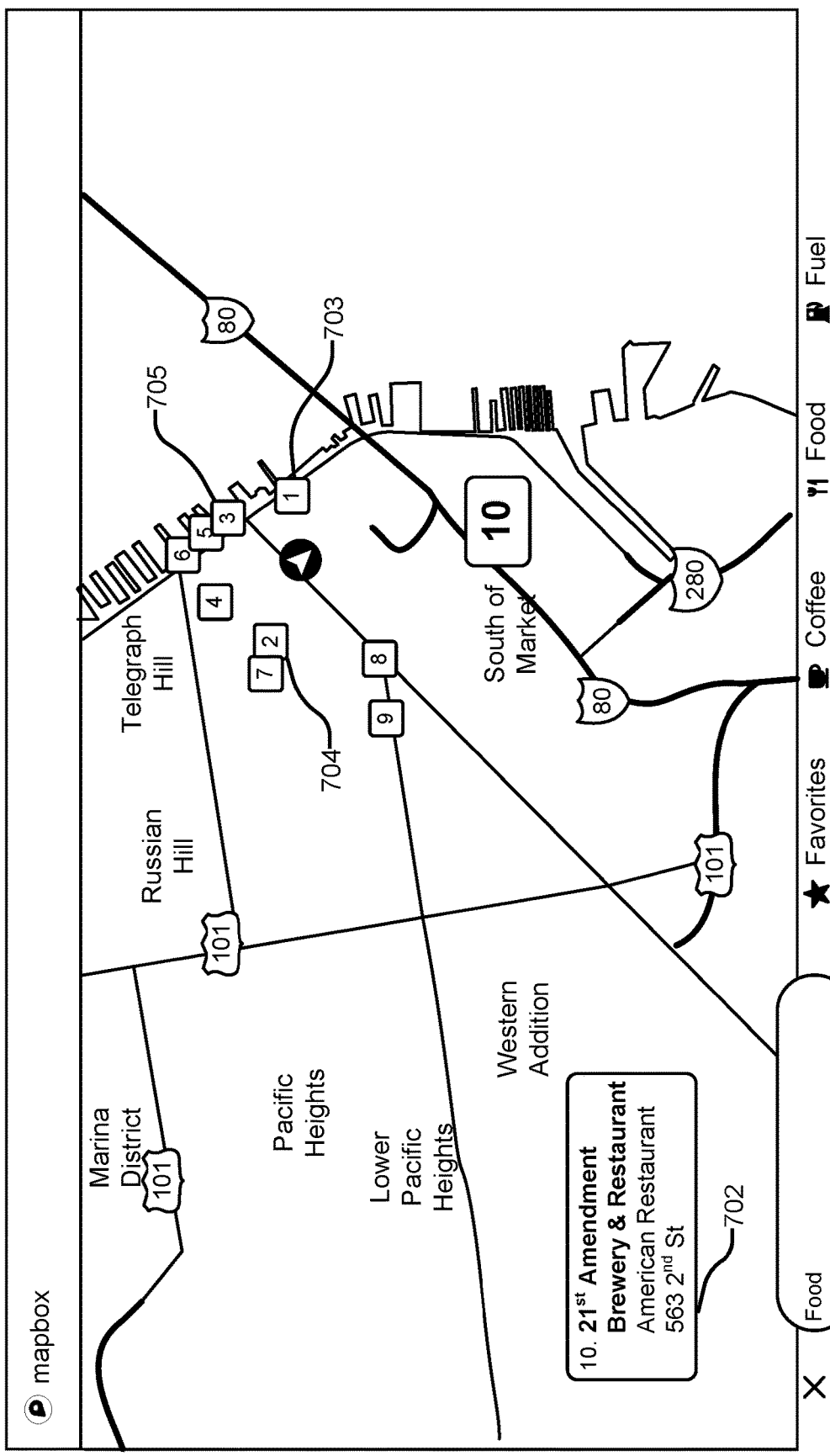
FIG. 7 illustrates an exemplary user interface for a search results state, according to one embodiment.
Figure 8:
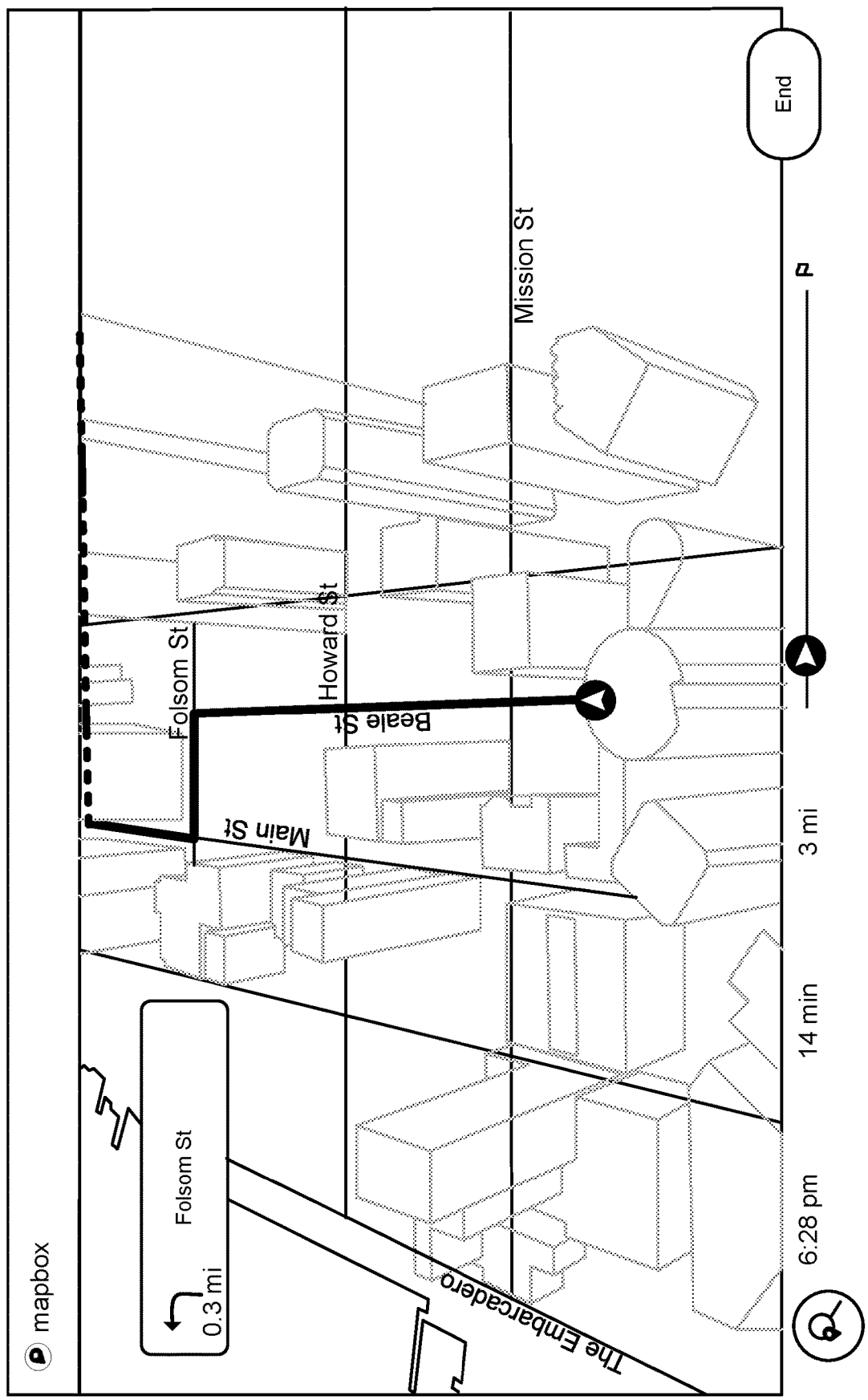
FIG. 8 illustrates an exemplary user interface for a route following driving state, according to one embodiment.

Anchor point determination module 406 determines an anchor point and a pitch level for displaying a map. A map may be presented with an angle tilted towards inside the screen or outside the screen. An anchor point defines a point on the screen around which the map programmatically centers, rotates, pitches and zooms. The horizontal position of an anchor point also defines the position of a vanishing point. In a pitched map, controlling the anchor point may help identify the vanishing point which preserves the perspective of the map geometry while the map is pitched. The anchor point determination module 406 may determine a pitch level and an anchor point based on a set of rules predetermined by a user. For example, in a route overview driving state, the anchor point may be located horizontally and vertically in the middle of the frame, such that the view of the map is not tilted towards inside or outside the screen (e.g. a bird's eye view), and in a route following state, the map is tilted around an anchor point that is located on the bottom edge of the screen, which makes the puck representing the vehicle appear closer to the viewer. Examples of displaying maps with no pitch angle are illustrated in FIGS. 5 and 7; examples of pitched maps are illustrated in FIGS. 6 and 8.

In one embodiment, when a vehicle approaches a maneuver (e.g. 180 meters away from the maneuver), anchor point determination module 406 may begin to change the pitch of the map to a top-down view (e.g. pitch degree changes from 45 degree to 0 degree) and the change of the pitch level may be completed at a predetermined distance away from the maneuver (e.g. 150 meters away from the maneuver). In one embodiment, the degree of pitch level may be proportional to the distance from the vehicle to the maneuver, such that as the vehicle approaches the maneuver, the pitch level changes to zero. As the vehicle finishes the maneuver, the pitch level may change from zero degree to a predetermined pitch level such as 45 degrees.

In one embodiment, anchor point determination module 406 may determine to ignore pitch level changes for consecutive maneuvers that are close to each other. For example, if two maneuvers are determined to be close to each other based on a predetermined threshold of distance, anchor point determination module 406 may combine the two consecutive maneuvers and treat the two maneuvers as one compound step, such that the anchor pitch determination module 406 does not change pitch levels in between the two maneuvers to provide a better user experience that avoids frequent map animations.

Center coordinates determination module 412 determines a set of center coordinates based on vehicle's location, anchor point, and an initial set of center coordinates determined by center coordinates determination module 314 in the viewport system 122. In one embodiment, in the case when a map is pitched with a certain angle, center coordinates determination module 412 may adjust the initial set of center coordinates based on an anchor point and a pitch level, because the initial set of center coordinates may no longer be the center coordinates with a different perspective such as the perspective of a pitched map. For a map with a pitch degree of zero, the anchor point is centered vertically and horizontally in the edge insets and the initial set of center coordinates is the center coordinates that align with the anchor point. In one embodiment, a map is associated with a max pitch level such as a maximum degree that a map may pitch. In a pitched map with a max pitch level, the anchor point may be displayed at the bottom of a frame defined by edge insets and centered horizontally in the edge sets. In a pitched map with the max pitch level, the puck representing the vehicle is aligned with the anchor point (e.g. centered horizontally in the edge sets and placed at the bottom of the frame). For map pitch angles between the minimum and maximum pitch levels, center coordinates determination module 412 may determine a pitch percentage by dividing the map's pitch level by the predetermined max pitch level. Center coordinates determination module 412 may further calculate a center line distance by determining the distance from the vehicle's location to the initial set of center coordinates. The adjusted center line distance is calculated as the center line distance*(1−pitch percentage). Then the adjusted center coordinates are determined by adjusting the vehicle's location by the adjusted center line distance.

The zoom level determination module 404 determines a zoom level by fitting the set of determined map coordinates into a set of edge insets determined by the edge insets determination module 306. Zoom level determination module 404 may determine a zoom level that fits the set of map coordinates into the set of edge insets. In one embodiment, zoom level determination module 404 may determine a maximum and a minimum zoom level for displaying a map, where a high zoom level may refer to a view displaying a smaller scale (e.g. 50 meters) while a low zoom level may refer to a view displaying a larger scale (e.g. 50 miles). The maximum and minimum zoom levels may help to prevent zooming in/out exceeding a threshold limit such that excessive or inadequate information is displayed. In one embodiment, the maximum zoom level is predetermined by a user to control the smallest scale to zoom in. The minimum zoom level may be determined by analyzing distances between the points of interest in the map. Zoom level determination module 404 may first calculate an average distance between the remaining points of interest and then calculate a reference distance by multiplying the average distance by a constant or a parameter (e.g. multiply average distance by 10). The reference distance may define an upper limit of the zoom level. For example, a vehicle may be navigating on a freeway with the next maneuver to occur after another 300 miles. The zoom level determination module 404 then determines a reference distance as an average distance between all the remaining maneuvers multiplying by a constant. The zoom level determination module 404 may determine the smallest zoom level to be the smaller value of the calculated reference distance or the distance to the end of the current step. As such, on a long step such as a 300 miles freeway, the frame may focus on a 10 miles zoom level instead of 300 miles based on the calculated reference distance. With a maximum and a minimum zoom level, the zoom levels determined by fitting map coordinates into edge insets are adjusted based on density of points interest. In the example discussed above, setting a minimum zoom level allows the upcoming maneuver to go off the screen on long steps. As the upcoming route step gets shorter and the calculated zoom level is larger than the minimum zoom level, the view of the map will begin to zoom in as the vehicle navigates along the route. Once the maximum zoom level is reached, the framing of the view will stop zooming and the maneuver on the map will begin to move toward the puck that represents the vehicle.

Map rotation determination module 408 determines rotation of a map as the vehicle makes maneuvers. As the vehicle turns, the map rotation determination module 408 may set the map's rotation to match the heading between the vehicle's location coordinates (or the beginning of the route line slice) and the end of the route line portion, which may result in a rotation of the map towards the direction of travel. When approaching the maneuver, the maneuver may be locked to the upper center of the viewport. In one embodiment, the difference between map rotation and vehicle heading is clamped to 20° to prevent extreme camera angles relative to the direction of actual travel.

In one embodiment, map rotation determination module 408 may determine a route line portion for controlling map rotation. Map rotation determination module 408 may determine the route line slice based on the determined reference distance (discussed above with zoom level determination module 404). The route line slice may be a slice of the upcoming route with the reference distance. The route line slice may be associated with a beginning point (e.g. location of the vehicle) and an end point. Map rotation determination module 408, instead of rotating the view for each maneuver in order to keep the vehicle in a head-up position, may determine to rotate the map such that the orientation of the map aligns with the end point of the route line slice. As the vehicle travels along consecutive maneuvers, the direction of the map always points to the end point of the upcoming route line slice, which reduces the swinging motion of the camera.

Arrival mode module 480 provides a view of the map upon arrival to a destination using functionalities provided by modules in the viewport system 122 and navigation system 333. In one embodiment, arrival to the destination is defined as the vehicle approaching the destination within a threshold of distance from the destination. Responsive to detecting the vehicle entering an arrival zone with a predetermined radius centered around the destination pin, which is a graphical indicator of the destination, arrival mode module 480 may be initiated. In an arrival mode module 480, the camera may frame the remaining route line and the pin for the destination. The view of the camera may exit a turn-by-turn navigation mode and change to a top-down view with no pitch level. The map may rotate such that the puck is always in a heading-up position. Exiting the turn-by-turn navigation mode (e.g. a route following driving state) and switching to a top-down view that displays the destination pin and the vehicle's location may give the user a sense of direction of the destination while searching for a place to park the vehicle.

While the vehicle is in the arrival zone, a reroute may be triggered (e.g. the vehicle passes the end of the route), arrival mode module 480 may stop displaying the route line and transition to a bird-eye view with vehicle's head pointing upwards. The frame may display the route's end coordinates, the destination pin location coordinates and map coordinates corresponding to the vehicle's location. As the vehicle approaches the destination or moves away from the destination, the coordinates determination module 410 may include additional or fewer map coordinates to display, which causes a change in zoom level. That is, the view of the map may zoom in responsive to the vehicle approaching the destination and may zoom out responsive to the vehicle moving away from the destination. Including both the vehicle and the destination pin in the frame may give the driver a sense of which direction to travel to get close to the destination while searching for a place to leave the vehicle. If the vehicle travels out of the arrival zone, the arrival mode module 480 may determine to transition to a free drive state or other driving states.

Arrival mode module 480 may further include additional features that may improve the user experience. In one embodiment, the arrival mode module 480 may also display the locations for nearby parking locations responsive to the vehicle entering the arrival zone. In another embodiment, an arrival mode module 480 may also detect that the vehicle has parked and may provide navigation instructions for walking to the original destination.

Winding road mode module 490 provides a user experience that avoids swing of the camera using functionalities provided by modules in the viewport system 122 and navigation system 333. Specifically, the winding road mode module 490 uses functionalities provided by the map rotation module 408 to provide a more stable view of the map while navigating on a winding road such as Lombard St. in San Francisco. In a conventional implementation, in contrast, as a vehicle makes a maneuver, the map rotates to align with the heading of the vehicle such that the vehicle is in a heading-up position, which may result in frequent camera swings when navigating on a winding road with frequent sharp turns. The functionality provided by the map rotation module 408 may provide an improved user experience that resolves the issue. Winding road mode module 490 may retrieve a reference distance determined by zoom level determination module 404 and generate a reference line using the reference distance. The reference line may have a beginning point that aligns with the vehicle and an end point that is apart from the beginning point by the reference distance. In a winding road mode, the map rotation may align with the direction of the end point of the reference line, instead of matching direction of the vehicle heading. The winding road mode 490 may result in less camera movement and less need to re-render the map to be displayed on the screen, which may further save battery life and is more power efficient.

FIGS. 5-12 illustrate example user interfaces of the navigation system. Example rules associated with each driving state are further discussed in accordance with FIGS. 5-12.

FIG. 5 illustrates an example user interface of a navigation system for a vehicle in a pre-drive state, where the vehicle may be started but is not yet in motion. The driving state determination module 402 may determine that a vehicle is in a pre-drive state based on one or more of the following parameters associated with the vehicle: speed (e.g. speed=0), gear selection (e.g. in a parking gear), or other configurations associated with the vehicle. In a pre-drive state, the navigation system may be configured to show map coordinates around the vehicle in a relatively large range (e.g., a radius of 10 miles) to give the viewer a sense of the surroundings. Based on the map coordinates and edge insets, a zoom level may be determined. The map may be always pointing towards north and the pitch level may be zero (i.e. no pitch degrees/bird's eye view).

FIG. 6 illustrates an example user interface for a vehicle in free drive state, where the navigation system is not instructed to provide search results or program a route. The driving state determination module 402 may determine that a vehicle is in a free drive state based on speed (e.g. under a threshold limit such as under 10 miles/hour), gear selection, or other configurations. The coordinates determination module 410 may determine a set of map coordinates to display based on a fixed radius (e.g. 500 meters). Alternatively, the coordinates determination module 410 may determine a range to include in the frame based on density of points of interest such that a larger area (resulting in a smaller zoom level) is displayed for a dense city and a smaller area (resulting in a higher zoom level) is displayed for a freeway in a rural area. The free drive state may be associated with a pitch level between 0 and 45 degrees, with the map direction aligned with the head of the vehicle. The free drive state may be associated with a map rotation because the view of the map aligns with the direction of the head of the vehicle.

FIG. 7 illustrates an example user interface for a vehicle in search state. A search state is entered when the navigation system receives user inputs from a user. A user may enter key words in a search box 701 and the viewport displays the search results in the map. The search results are displayed as items in a paginated list at the bottom of the screen such as search result 702. The coordinates determination module 410 may determine to include map coordinates for all search results (e.g. numbered squares such as element 703-705) as well as the vehicle's current location. In one embodiment, the list of search results may initially display a limited number of results (e.g. 5 results), in which case the map may display the five results. As the user scrolls the list and reveals more results, the map may display all the results viewed by the viewer (e.g. results 1 to 6, 1 to 7, . . . ). The search state may be associated with a pitch level of zero and the map may point to north without rotation.

FIG. 8 illustrates an example user interface for a vehicle in a route following state, in which a vehicle follows a programmed route to a destination. In a route following state, the coordinates determination module 410 may determine to include the map coordinates in the current step or map coordinates determined based on the reference distance if the current step is a long step (e.g. a 300 miles freeway). By fitting the set of map coordinates to display into a set of edge insets, the zoom level determination module 404 may determine a zoom level. As the vehicle travels along the programmed route, the number of map coordinates to include decreases. In one embodiment, for each location update of the vehicle, coordinates determination module 410 may re-determine the set of map coordinates to include, and the center coordinates determination module 412 may recalculate a set of center coordinates based on the vehicle's updated location. As a result, the zoom level determination module 404 may recalculate a zoom level based on the updated set of map coordinates, which may result in a higher zoom level, focusing on the remaining route. The zoom level determination module 404 may limit the maximum zoom level (e.g. determined by a preconfigured max zoom level). The route following state may be associated with a pitch level with the vehicle puck displayed at the bottom of the frame. The map may rotate to track the traveling direction of the vehicle.

Figure 9:
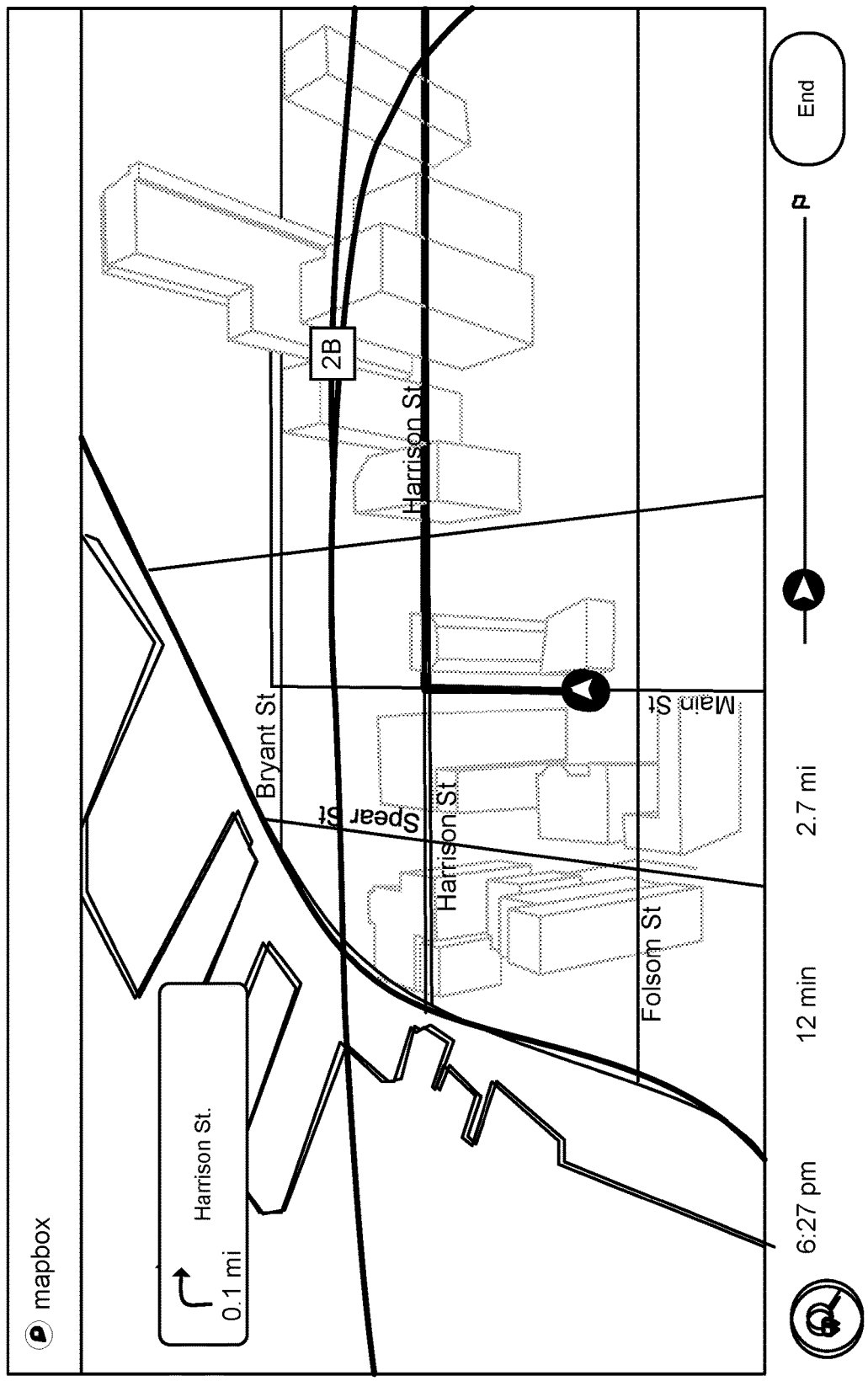
FIG. 9 illustrates an exemplary user interface for an approaching maneuver state, according to one embodiment.

FIG. 9 illustrates an example user interface for a vehicle in an approaching maneuver driving state. The coordinates determination module 404 may determine to include map coordinates for the remaining route line in current step and a portion of the route line for the following step (e.g. 30 meters of the step following) to give a sense of the upcoming step after the current maneuver. When the vehicle approaches a maneuver, the number of remaining map coordinates to include is usually small, which results in a close-up view of the maneuver and the step that will happen after the current maneuver. In the situation when two consecutive maneuvers are close together (e.g. within a predetermined distance), the coordinates determination module 404 may determine to include map coordinates corresponding to both the maneuvers and include an extra portion of the route following the second maneuver.

Figure 10:
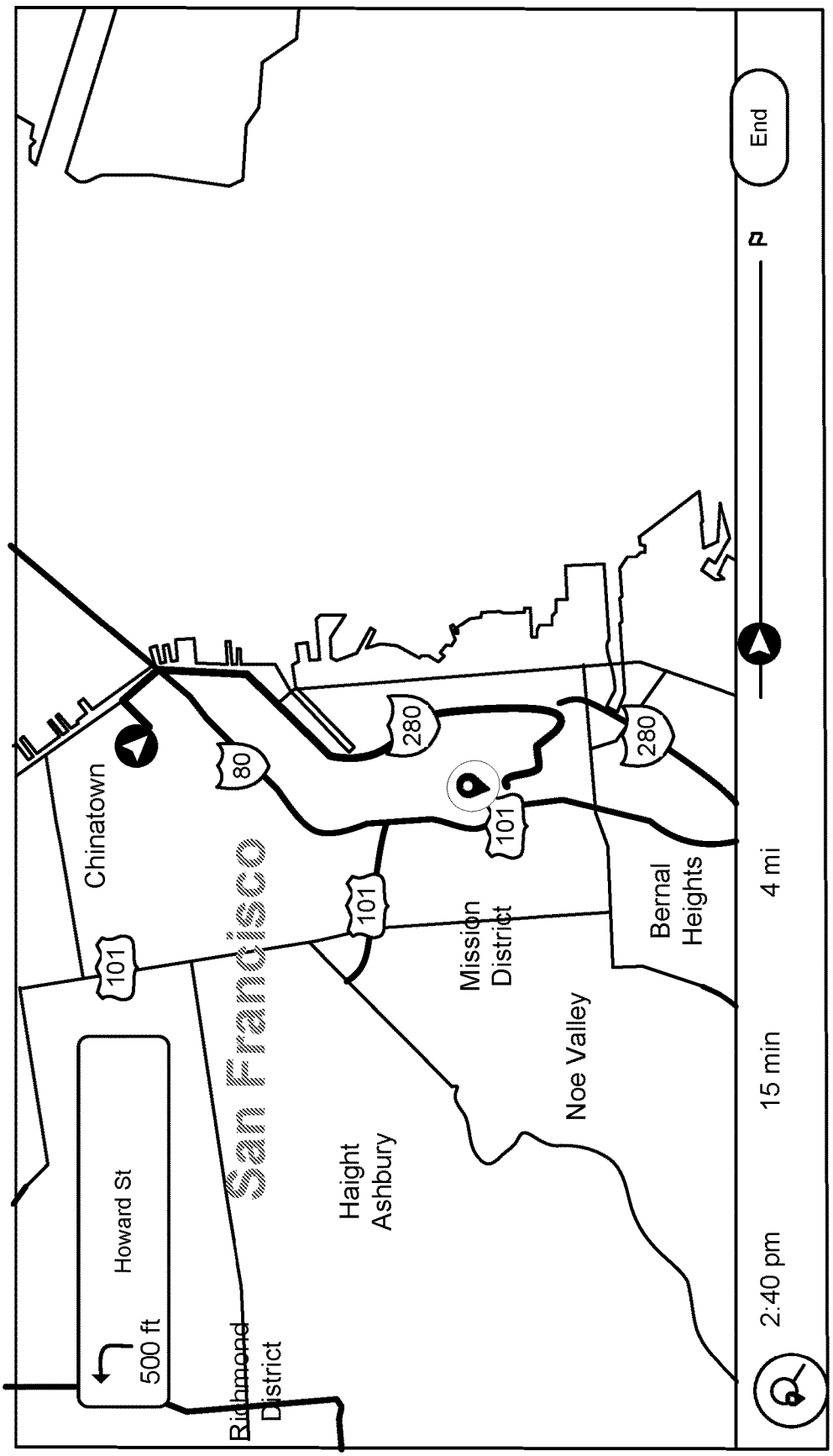
FIG. 10 illustrates an exemplary user interface for a route following overview state, according to one embodiment.

FIG. 10 illustrates an example user interface for a vehicle in a route following overview state for getting an overall sense of the vehicle's current location, the distance to the destination, and the remaining route. A route following overview driving state may also display alternate route and incidents in the state. Accordingly, coordinates determination module 404 may determine to include map coordinates for the vehicle's current location, remaining route, and/or alternate routes. A route following overview state may have a pitch level of zero degree without map rotation.

Figure 11:
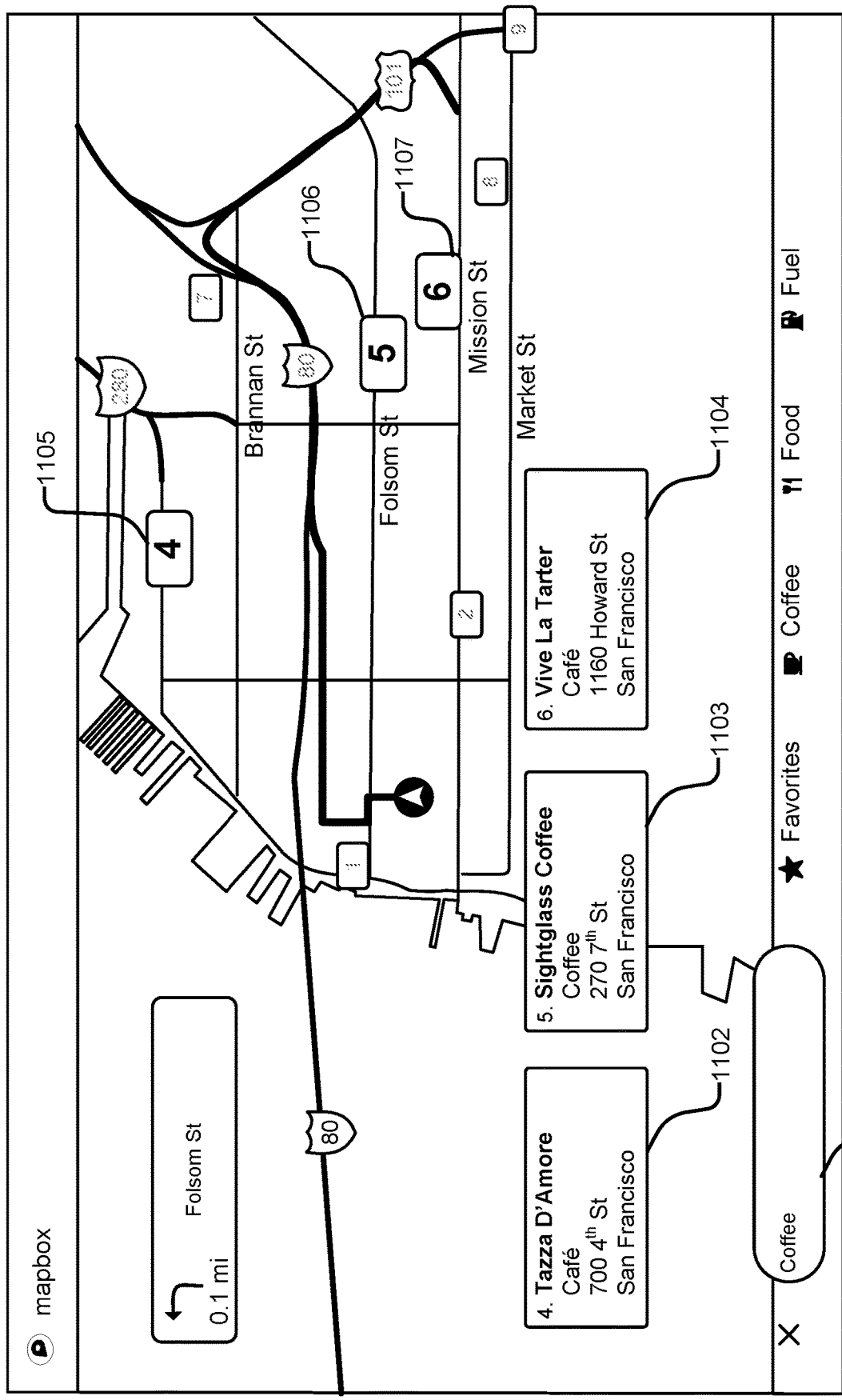
FIG. 11 illustrates an exemplary user interface for searching along a route with a route preview to stopover state, according to one embodiment.

FIG. 11 illustrates an example user interface for a vehicle in a route preview to stopover state. The route preview to stopover state previews the selected stopover destination. In one embodiment, the route preview to stopover state shows the route from the vehicle's current location to the stopover and may further show the route from the stopover to the original destination. In one embodiment, the framing may focus on the route line from current location to stopover destination. The route preview to stopover state may include a list of results at the bottom of the frame showing the search results (e.g. 1102-1104). In one embodiment, the search results are numbered and displayed in the map, with the search results that are currently displayed on the screen in a different font or style. For example, search results 1102-1104 are displayed in the frame, and as a result, elements 1105-1107 are displayed in a different style to distinguish from the search results not being displayed.

In one embodiment, a vehicle may be associated with other driving states such as route preview state, search along route state, route preview to stopover state, and search near destination state, etc. A route preview state may be the state after the user selects a destination and a programmed route is calculated for display. The route preview state may include a view of the whole route and the vehicle's current location, with no pitch degree and the map in a north-up orientation. A search along route state may refer to a state where the user may program in a stopover destination by selecting one from search results. A route preview to stopover state may refer to a driving state that gives a preview of the selected stopover destination. The state shows the route from the vehicle's current location not the stopover destination, and from the stopover destination to the original destination. The frame of the view focuses on the route line from the current location to stopover destination. A search near the destination state may refer to a state for searching results near the destination pin. The view may be a north-up orientation and frames map coordinates for the returned search results, not including the vehicle's current location.

FIG. 12 illustrates an exemplary process for dynamically framing and displaying a map with functionalities provided by the viewport system 122. The process 1200 may start with receiving 1210 a location of the client device 104. The state determination module 302 may determine 1220 a state associated with the client device 104, where the state is determined based on telemetry data retrieved from the client device 104. The state may determine a view of the map to display, such as an overhead view with north up, no pitch angle for the pre-drive state. Edge insets determination module 306 may receive 1230 a set of edge insets that defines the dimensions for the frame to display the map. Map coordinates determination module 304 may determine 1240 a set of map coordinates that represent points of interest in the map to display in the frame. Center coordinates determination module 314 may determine 1250 a set of center coordinates that represent map coordinates to be displayed in center of the frame. Using the set of map coordinates and the set of edge insets as input, the view port system may generate 1260 a view by fitting the set of map coordinates inside the frame defined by the set of edge insets. The viewport system may then 1270 display the generated view to the client device 104.

Alternative Embodiments

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for dynamically displaying a map on a client device comprising:
   receiving location information indicating geographic coordinates associated with the client device;
   determining an initial state of the client device determined from telemetry information received from the client device;
   determining a set of edge insets indicating dimensions of a frame for displaying the map on the client device;
   receiving a first set of coordinates representing a selection of points of interest (POIs) from a plurality of POIs in the map, the first set of coordinates to be displayed in the frame wherein the selection of POIs is based on the initial state and the corresponding first set of coordinates to be displayed in the frame;
   determining a set of center coordinates based on the first set of coordinates;
   responsive to a user interacting with the client device, determining a changed state of the client device induced by the user interaction, the changed state determined based on the initial state and additional telemetry information received from the client device;
   dynamically generating views for display on the client device by:
      generating a first view based on the set of center coordinates, the first view fitting the selected POIs corresponding to the first set of coordinates inside the frame indicated by the edge insets, wherein the first view is dynamically generated based on the changed state of the client device; and
      detecting one or more additional states of the client device based on changes in telemetry information received from the client device;
      modifying the selection of POIs based on the additional state and the selected POIs corresponding to their respective set of coordinates;
      generating one or more additional views fitting the modified selection of POIs corresponding to their respective set of coordinates, wherein the one or more additional views alter how information is presented to the user based on the detected additional state; and
      generating transitions between generated views that alters how information is displayed based on associated client device state changes; and
   dynamically displaying the generated views to the client device, wherein the client device displays a generated map transition between views responsive to detecting client device state changes, and
   wherein determining the initial state, the changed state, and the one or more additional states comprises:
      determining the telemetry information that represents a driving state of a plurality of driving states, wherein each driving states corresponds to a particular set of characteristics present in the telemetry information; and determining the initial state, the changed state, and the one or more additional states is based on the determined driving state, wherein the changed state represents a change between two driving states of the plurality of driving states.

2. The method of claim 1 further comprising:

receiving an updated location of the client device, wherein the set of coordinates and the location are associated with a route to a destination, and wherein the updated location is associated with a portion of the route to the destination;

determining a subset of the set of coordinates based on the updated location of the client device;

determining a second set of center coordinates based on the subset of coordinates;

generating a second view based on the second set of center coordinates, the second view fitting the subset of coordinates inside the frame indicated by the edge insets; and displaying the second view to the client device.

3. The method of claim 1, further comprising:

receiving a second set of edge insets, the second set of edge insets different from the first set of edge insets, the second set of edge insets indicating edges of a second frame for displaying the map on the client device;

generating an updated view based on the set of center coordinates, the updated view fitting the set of coordinates inside the second frame; and displaying the second view to the client device.

4. The method of claim 1, wherein the initial state is a driving state including one or more of the following: pre-drive state, free-drive state, search results, route preview, route following, approaching maneuver, search along route, and route preview to stopover.

5. The method of claim 4, wherein each state is associated with a set of parameters that indicate a set of map coordinates, the parameters including one or more of the following: zoom level, pitch level, direction of the first view, or map rotation.

6. The method of claim 1, further comprising:

determining a pitch level based on the initial state;

determining an anchor point based on the pitch level;

calculating a distance between the anchor point and the center coordinates; and displaying a puck representing the client device based on the distance and a degree of the pitch level, wherein, in a route overview driving state, the anchor point is located horizontally and vertically in a middle of the frame such that the first view is not tilted towards inside or outside a screen of the client device, and wherein, in a route following state, the first view is tilted around the anchor point that is located on a bottom edge of the first view.

7. The method of claim 1, further comprising generating an animation based on a set of initial map parameters and a set of final map parameters using an animation interpolator.

8. The method of claim 7, wherein each map parameter is adjusted by an individual animation interpolator.

9. A non-transitory computer readable storage medium storing executable instructions for displaying a map on a client device that, when executed by one or more processors, cause the one or more processors to perform steps comprising:

receiving location information indicating geographic coordinates associated with the client device;

determining an initial state of the client device determined from telemetry information received from the client device;

determining a set of edge insets indicating dimensions of a frame for displaying the map on the client device;

receiving a first set of coordinates representing a selection of points of interest (POIs) from a plurality of POIs in the map, the first set of coordinates to be displayed in the frame wherein the selection of POIs is based on the initial state and the corresponding first set of coordinates to be displayed in the frame;

determining a set of center coordinates based on the first set of coordinates;

responsive to a user interacting with the client device, determining a changed state of the client device induced by the user interaction, the changed state determined based on the initial state and additional telemetry information received from the client device;

dynamically generating views for display on the client device by:

generating a first view based on the set of center coordinates, the first view fitting the selected POIs corresponding to the first set of coordinates inside the frame indicated by the edge insets, wherein the first view is dynamically generated based on the changed state of the client device; and detecting one or more additional states of the client device based on changes in telemetry information received from the client device;

modifying the selection of POIs based on the additional state and the selected POIs corresponding to their respective set of coordinates;

generating one or more additional views fitting the modified selection of POIs corresponding to their respective set of coordinates, wherein the one or more additional views alter how information is presented to the user based on the detected additional state; and generating transitions between generated views that alters how information is displayed based on associated client device state changes; and dynamically displaying the generated views to the client device, wherein the client device displays a generated map transition between views responsive to detecting client device state changes, and wherein determining the initial state, the changed state, and the one or more additional states comprises:

determining the telemetry information that represents a driving state of a plurality of driving states, wherein each driving states corresponds to a particular set of characteristics present in the telemetry information; and determining the initial state, the changed state, and the one or more additional states is based on the determined driving state, wherein the changed state represents a change between two driving states of the plurality of driving states.

10. The non-transitory computer readable storage medium of claim 9, wherein the steps further comprise:

receiving an updated location of the client device, wherein the set of coordinates and the location are associated with a route to a destination, and wherein the updated location is associated with a portion of the route to the destination;

determining a subset of the set of coordinates based on the updated location of the client device;
determining a second set of center coordinates based on the subset of coordinates;
generating a second view based on the second set of center coordinates, the second view fitting the subset of coordinates inside the frame indicated by the edge insets;
displaying the second view to the client device.

11. The non-transitory computer readable storage medium of claim 9, wherein the steps further comprise:
receiving a second set of edge insets, the second set of edge insets different from the first set of edge insets, the second set of edge insets indicating edges of a second frame for displaying the map on the client device;
generating an updated view based on the set of center coordinates, the updated view fitting the set of coordinates inside the second frame; and
displaying the second view to the client device.

12. The non-transitory computer readable storage medium of claim 9, wherein the initial state is a driving state including one or more of the following: pre-drive state, free-drive state, search results, route preview, route following, approaching maneuver, search along route, and route preview to stopover.

13. The non-transitory computer readable storage medium of claim 9, wherein the steps further comprise:
determining a pitch level based on the initial state;
determining an anchor point based on the pitch level;
calculating a distance between the anchor point and the center coordinates; and
displaying a puck representing the client device based on the distance and a degree of the pitch level,
wherein, in a route overview driving state, the anchor point is located horizontally and vertically in a middle of the frame such that the first view is not tilted towards inside or outside a screen of the client device, and
wherein, in a route following state, the first view is tilted around the anchor point that is located on a bottom edge of the first view.

14. The non-transitory computer readable storage medium of claim 9, wherein the step further comprises generating an animation based on a set of initial map parameters and a set of final map parameters using an animation interpolator.

15. The non-transitory computer readable storage medium of claim 14, wherein each map parameter is adjusted by an individual animation interpolator.

16. A computing system comprising:
a processor; and
a non-transitory computer-readable storage medium storing instructions for displaying a map on a client device, the instructions when executed by the processor cause the processor to perform steps including:
receiving location information indicating geographic coordinates associated with the client device;
determining an initial state of the client device determined from telemetry information received from the client device;
determining a set of edge insets indicating dimensions of a frame for displaying the map on the client device;
receiving a first set of coordinates representing a selection of points of interest (POIs) from a plurality of POIs in the map, the first set of coordinates to be displayed in the frame wherein the selection of POIs is based on the initial state and the corresponding first set of coordinates to be displayed in the frame;
determining a set of center coordinates based on the first set of coordinates;
responsive to a user interacting with the client device, determining a changed state of the client device induced by the user interaction, the changed state determined based on the initial state and additional telemetry information received from the client device;
dynamically generating views for display on the client device by:
generating a first view based on the set of center coordinates, the first view fitting the selected POIs corresponding to the first
set of coordinates inside the frame indicated by the edge insets, wherein the first view is dynamically generated based on the changed state of the client device; and
detecting one or more additional states of the client device based on changes in telemetry information received from the client device;
modifying the selection of POIs based on the additional state and the selected POIs corresponding to their respective set of coordinates;
generating one or more additional views fitting the modified selection of POIs corresponding to their respective set of coordinates, wherein the one or more additional views alter how information is presented to the user based on the detected additional state; and
generating transitions between generated views that alters how information is displayed based on associated client device state changes; and
dynamically displaying the generated views to the client device, wherein the client device displays a generated map transition between views responsive to detecting client device state changes, and
wherein determining the initial state, the changed state, and the one or more additional states comprises:
determining the telemetry information that represents a driving state of a plurality of driving states, wherein each driving states corresponds to a particular set of characteristics present in the telemetry information; and
determining the initial state, the changed state, and the one or more additional states is based on the determined driving state,
wherein the changed state represents a change between two driving states of the plurality of driving states.

17. The computing system of claim 16, wherein the steps further comprise:
receiving an updated location of the client device, wherein the set of coordinates and the location are associated with a route to a destination, and wherein the updated location is associated with a portion of the route to the destination;
determining a subset of the set of coordinates based on the updated location of the client device;
determining a second set of center coordinates based on the subset of coordinates;
generating a second view based on the second set of center coordinates, the second view fitting the subset of coordinates inside the frame indicated by the edge insets; and
displaying the second view to the client device.

18. The computing system of claim 16, wherein the steps further comprise:
- receiving a second set of edge insets, the second set of edge insets different from the first set of edge insets, the second set of edge insets indicating edges of a second frame for displaying the map on the client device;
- generating an updated view based on the set of center coordinates, the updated view fitting the set of coordinates inside the second frame;
- displaying the second view to the client device.

19. The computing system of claim 16, wherein the steps further comprise:
- determining a pitch level based on the initial state;
- determining an anchor point based on the pitch level;
- calculating a distance between the anchor point and the center coordinates; and
- displaying a puck representing the client device based on the distance and a degree of the pitch level,
- wherein, in a route overview driving state, the anchor point is located horizontally and vertically in a middle of the frame such that the first view is not tilted towards inside or outside a screen of the client device, and
- wherein, in a route following state, the first view is tilted around the anchor point that is located on a bottom edge of the first view.

20. The computing system of claim 16, wherein the step further comprises generating an animation based on a set of initial map parameters and a set of final map parameters using an animation interpolator.

* * * * *